Dec. 8, 1942.    F. O. CARLSON    2,304,625
GRADOMETER
Filed Aug. 13, 1941
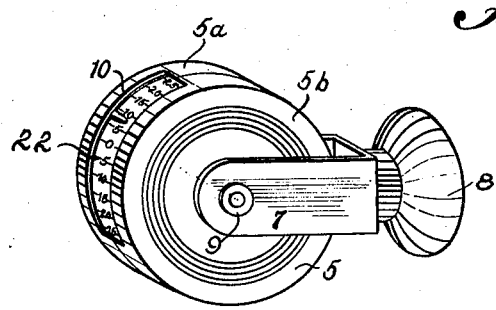
Fig. 1
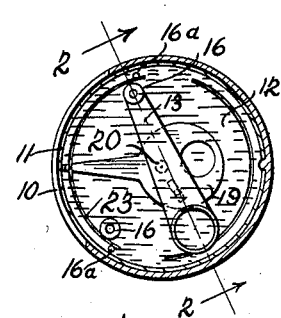
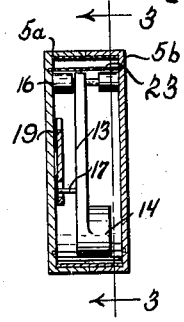
Fig. 2
Fig. 3
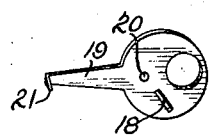
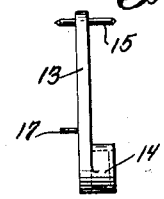
Fig. 5
Fig. 4
Inventor
Frederick O. Carlson
By Samuel Herrick
Attorney Patented Dec. 8, 1942

2,304,625

UNITED STATES PATENT OFFICE 2,304,625

GRADOMETER

Frederick O. Carlson, Tuckahoe, N. Y.

Application August 13, 1941, Serial No. 406,699

1 Claim. (Cl. 33—215)

This invention relates to an indicating instrument which I term a grade-o-meter. The primary object of the invention is to provide a device adapted to be attached to the dash, windshield, or any other convenient part of a motor vehicle and which will serve to accurately indicate the percentage of grade of the road over which the vehicle happens to be traveling. The percentage of grade is indicated whether uphill or downhill.

It is a further object of the invention to provide a device of the character indicated which will not be adversely affected to too great a degree by the vibration incident to travel over the roadbed at substantial rates of speed. Further objects and advantages of the invention will be set forth in the detailed description which follows:

In the accompanying drawing, Fig. 1 is a perspective view of a grade meter constructed in accordance with the invention;

Fig. 2 is a transverse sectional view therethrough upon line 2—2 of Fig. 3;

Fig. 3 is a vertical sectional view upon line 3—3 of Fig. 2;

Fig. 4 is a perspective view of the pointer or indicator carrying arm, and,

Fig. 5 is a side view of the pendulum hereinafter described.

Like numerals designate corresponding parts throughout the several figures of the drawing.

The casing 5 of the device is preferably made in the two halves 5ª, 5ᵇ for ease of assembly and when these two halves are cemented together they constitute a hollow, cylindrical body, within which the working parts of the device are housed and operate. A yoke 7 carries a vacuum cup 8, by which the structure may be supported upon any part of an automobile or any other motor vehicle where its scale will be readily visible to the driver.

The casing 5 is pivotally mounted at 9 in the arms of the yoke 7 and frictionally held so that the casing may be rotated with respect to the yoke. Thus, the vacuum cup may be applied to parts of the automobile which lie at an inclination and yet the casing may be rotated to indicate zero when the vehicle is on level ground. The confronting edges of the two halves of the casing 5 are cut away as indicated at 10 to complementally form a sight opening. This sight opening is covered by a curved transparent sheet 11 which has fluid tight engagement with the walls of the structure so that the casing as a whole is adapted to receive and retain the body of liquid 12.

This mixture may be oil, glycerine, a mixture of glycerine and water or any other material which will be non-freezing, non-corrosive and which will act to so dampen the movement of the pendulum, hereinafter described, that vibration of the vehicle will not cause undue vibration of the indicator pointer. A pendulum 13, the lower end of which may be weighted by a body of metal 14, is provided with a transverse bearing pin 15 adapted to be seated in sockets 16 formed in bosses which project inwardly from the opposed halves of the casing. This pendulum carries a pin 17 which engages in a slot 18 of an arm 19.

This arm is pivoted at 20 concentrically within the casing 5 and the slot 18 is at such an angle that as the body of the casing changes position with respect to the lower end of the pendulum, as the motor vehicle encounters different grades, a pointer upon the outer end of the arm, is caused to occupy varying positions with respect to the body of the casing. This pointer cooperates with a graduated scale 22 that is formed upon an opaque strip 23 which lies behind the transparent strip 11. The pointer projects laterally from arm 19, so that it lies between the transparent strip and the opaque strip. The function of the pendulum is to hold the pointer in a neutral indicating position, the apparent reading of the scale being brought about by the movement of the scale with respect to the pointer, when the casing 5 changes its position as the vehicle assumes varying degrees of inclination.

I do not limit myself to any particular kind of material for the manufacture of this instrument. However, I find it advantageous as well as economical to make the casing, pendulum, indicator arm, scale carrying strip, and in fact, practically all of the parts of Celluloid, hard rubber, Bakelite or other artificial plastics.

It will be observed that the scale figures increase in value upon opposite sides of a central zero point. Thus, the percentage of grade is indicated as either uphill or downhill as the case may be. The scale carrying strip 23 may be held in place by being merely sprung into position between the bosses 16 and pins 16ª carried by the casing.

The needlepoint bearing of the element 15 in the bosses 16 together with the counter-balancing of the pointer 21 by the enlarged rear portion of the arm 19, makes the device extremely sensitive. The graduations 22 will be so spaced as to give the correct reading.

Since many ways will readily suggest themselves to those skilled in the art, of modifying the arrangement shown, I wish it to be understood that the invention is not limited to the precise construction set forth, but that it includes within its purview whatever changes fairly come within either the terms or the spirit of the appended claim.

Having described my invention, what I claim is:

A structure of the character described comprising a cylindrical casing provided along its side with a sight opening, said casing being made in two cup-like halves secured together, bearing bosses carried by said opposite halves, a pendulum carrying a transverse bearing pin pivotally engaged in said bosses, a pointer carrying arm pivotally mounted upon one side of the casing, a pin and slot connection between said arm and one side of the pendulum, a transversely extending pointer upon the pointer carrying arm and a scale carrying strip within the casing rearwardly of said pointer.

FREDERICK O. CARLSON.